United States Patent
Prasad et al.

(10) Patent No.: US 10,592,172 B2
(45) Date of Patent: *Mar. 17, 2020

(54) APPLICATION TRANSPARENT CONTINUOUS AVAILABILITY USING SYNCHRONOUS REPLICATION ACROSS DATA STORES IN A FAILOVER CLUSTER

(71) Applicant: MICROSOFT TECHNOLOGY LICENSING, LLC, Redmond, WA (US)

(72) Inventors: Ganesh Prasad, Bellevue, WA (US); Roopesh Battepati, Bellevue, WA (US); Vyacheslav Kuznetsov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/795,537

(22) Filed: Oct. 27, 2017

(65) Prior Publication Data
US 2018/0067698 A1   Mar. 8, 2018

Related U.S. Application Data

(63) Continuation of application No. 14/848,318, filed on Sep. 8, 2015, now Pat. No. 9,804,802.
(Continued)

(51) Int. Cl.
*G06F 11/00* (2006.01)
*G06F 3/06* (2006.01)
*G06F 11/20* (2006.01)

(52) U.S. Cl.
CPC .......... *G06F 3/0683* (2013.01); *G06F 3/065* (2013.01); *G06F 3/0619* (2013.01);
(Continued)

(58) Field of Classification Search
CPC ............ G06F 11/1451; G06F 11/1469; G06F 11/1612; G06F 11/1662; G06F 11/203;
(Continued)

(56) References Cited

U.S. PATENT DOCUMENTS 5,870,537 A   2/1999   Kern et al.
6,173,420 B1   1/2001   Sunkara et al.
(Continued)

FOREIGN PATENT DOCUMENTS

CN   101379763 A   3/2009
CN   101640688 A   2/2010
(Continued)

OTHER PUBLICATIONS

"Office Action Issued in Chinese Patent Application No. 201580048056.7", dated Feb. 22, 2019, 13 Pages.
(Continued)

*Primary Examiner* — Marc Duncan
(74) *Attorney, Agent, or Firm* — Workman Nydegger

(57) ABSTRACT

Disclosed herein is a system and method for automatically moving an application from one site to another site in the event of a disaster. Prior to coming back online the application is configured with information to allow it to run on the new site without having to perform the configuration actions after the application has come online. This enables a seamless experience to the user of the application while also reducing the associated downtime for the application.

20 Claims, 4 Drawing Sheets

Related U.S. Application Data

(60) Provisional application No. 62/047,634, filed on Sep. 8, 2014.

(52) U.S. Cl.
CPC ........ *G06F 11/203* (2013.01); *G06F 11/2033* (2013.01); *G06F 11/2097* (2013.01); *G06F 11/2041* (2013.01); *G06F 11/2048* (2013.01)

(58) Field of Classification Search
CPC ............. G06F 11/2033; G06F 11/2048; G06F 11/2094; G06F 11/2097; G06F 3/0619; G06F 3/0647; G06F 3/065; G06F 3/0683
See application file for complete search history.

(56) References Cited

U.S. PATENT DOCUMENTS

| | | | |
|---|---|---|---|
| 7,039,660 | B2 | 5/2006 | Kitsuregawa et al. |
| 7,392,421 | B1 | 6/2008 | Bloomstein et al. |
| 7,542,987 | B2 | 6/2009 | Lubbers et al. |
| 7,650,529 | B2 | 1/2010 | Fan et al. |
| 7,814,050 | B2 | 10/2010 | Mehta et al. |
| 7,873,804 | B2 | 1/2011 | Agombar et al. |
| 8,335,765 | B2 | 12/2012 | Sivasubramanian et al. |
| 8,572,031 | B2 | 10/2013 | Merriman et al. |
| 8,600,945 | B1 | 12/2013 | Natanzon et al. |
| 9,104,741 | B2 * | 8/2015 | Fujibayashi ........ G06F 11/2069 |
| 9,176,829 | B2 | 11/2015 | Jain et al. |
| 2006/0047776 | A1 | 3/2006 | Chieng et al. |
| 2006/0112244 | A1 | 5/2006 | Buah et al. |
| 2008/0072000 | A1 * | 3/2008 | Osaki .................. G06F 11/1662 711/162 |
| 2011/0078494 | A1 | 3/2011 | Maki et al. |
| 2012/0066394 | A1 | 3/2012 | Revanuru et al. |
| 2012/0192006 | A1 | 7/2012 | Qi et al. |
| 2012/0239697 | A1 | 9/2012 | Ram et al. |
| 2012/0278568 | A1 | 11/2012 | Broido et al. |
| 2012/0310887 | A1 | 12/2012 | Taranov et al. |
| 2014/0012721 | A1 | 1/2014 | Chittigala et al. |
| 2014/0047263 | A1 | 2/2014 | Coatney et al. |
| 2014/0379645 | A1 * | 12/2014 | Wickremesinghe .. G06F 11/203 707/624 |
| 2015/0039930 | A1 * | 2/2015 | Babashetty ......... G06F 11/1464 714/4.11 |
| 2015/0172111 | A1 | 6/2015 | Lalsangi et al. |
| 2016/0085648 | A1 | 3/2016 | Joshi et al. |
| 2017/0024293 | A1 | 1/2017 | Bell et al. |
| 2018/0210796 | A1 * | 7/2018 | Lalsangi ............. G06F 11/1479 |

FOREIGN PATENT DOCUMENTS

| | | |
|---|---|---|
| CN | 103534955 A | 1/2014 |
| CN | 103560906 A | 2/2014 |

OTHER PUBLICATIONS

"Failover and Failover Modes (AlwaysOn Availability Groups)", Retrieved from «https://web.archive.org/web/20130724084921/http://msdn.microsoft.com/en-us/library/hh213151.aspx», Jul. 24, 2013, 12 Pages.

"Non-Final Office Action Issued in U.S. Appl. No. 14/848,318", dated Feb. 8, 2017, 14 Pages.

"Notice of Allowance Issued in U.S. Appl. No. 14/848,318", dated Jun. 28, 2017, 7 Pages.

"International Search Report and Written Opinion issued in PCT Application No. PCT/US2015/049042", dated Jan. 7, 2016, 10 Pages.

"Office Action Issued in European Patent Application No. 15771806.5", dated Sep. 5, 2019, 5 Pages.

* cited by examiner

APPLICATION TRANSPARENT CONTINUOUS AVAILABILITY USING SYNCHRONOUS REPLICATION ACROSS DATA STORES IN A FAILOVER CLUSTER

CROSS REFERENCE TO RELATED APPLICATION

This application is a continuation of U.S. patent Ser. No. 14/848,318, filed Sep. 8, 2015, and titled "APPLICATION TRANSPARENT CONTINUOUS AVAILABILITY USING SYNCHRONOUS REPLICATION ACROSS DATA STORES IN A FAILOVER CLUSTER," and which is now U.S. Pat. No. 9,804,802, issued Oct. 31, 2017, which claims priority to U.S. Provisional Patent Application 62/047,634, filed Sep. 8, 2014, and titled "PROVIDING APPLICATION TRANSPARENT CONTINUOUS AVAILABILITY USING SYNCHRONOUS REPLICATION ACROSS DATA STORES IN A FAILOVER CLUSTER. The entire contents of each of the foregoing applications are incorporated by reference herein in their entireties.

BACKGROUND

Applications and sites fail for a variety of reasons. When they fail, it becomes necessary to move the application to a new location to maintain application availability. Synchronous block replication in a failover cluster environment requires application downtime and manual storage resource dependency changes as a part of a disaster recovery workflow. This is because the application is moved from the location that has failed to another location that is capable of supporting the application. In order to achieve this, the physical disk resource to physical data store mapping needs to be changed to permit the associated application to operate on the new location. These changes are made after the associated application has been brought back up on the new location. This results in an extended period of application downtime for the user.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present disclosure provides a system and method for automatically moving an application from one site to another site in the event of a disaster. Prior to coming back online, the application is configured with information to allow it to run on the new site without having to perform those actions after the application has become online. This provides for a seamless experience to the user of the application while also reducing the associated downtime for the application.

When a primary site for an application goes down due to disaster or other reason and the application resource group (that also contains any replicated disks) moves to a secondary site that holds a synchronous target replica, the cluster physical disk resource to physical data store mapping is modified to use the target replica before the application resource comes online resulting in automatic role switch. This mechanism virtualizes the application dependent cluster physical disk resource from multiple synchronous copies of data in various sites allowing seamless failover and failback capabilities.

The present disclosure also allows a cluster replication resource to maintain cluster wide replication state of all target replicas allowing it to decide if a target is eligible to be source of replication in the event of a disaster. The target replica connects to source replica without using a well-known endpoint. When source replica fails over to a different node within a primary site, the target replica in secondary site discovers the new endpoint to connect to and resumes replication.

The cluster replication resource automatically adjusts the possible owners nodes of the source and target replica based on the replication state, replication service availability, storage connectivity, arrival, or departure of nodes in cluster due to membership changes. This allows the application resource group to failover to only those nodes where this is a high chance of the success due to availability of all required resources.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
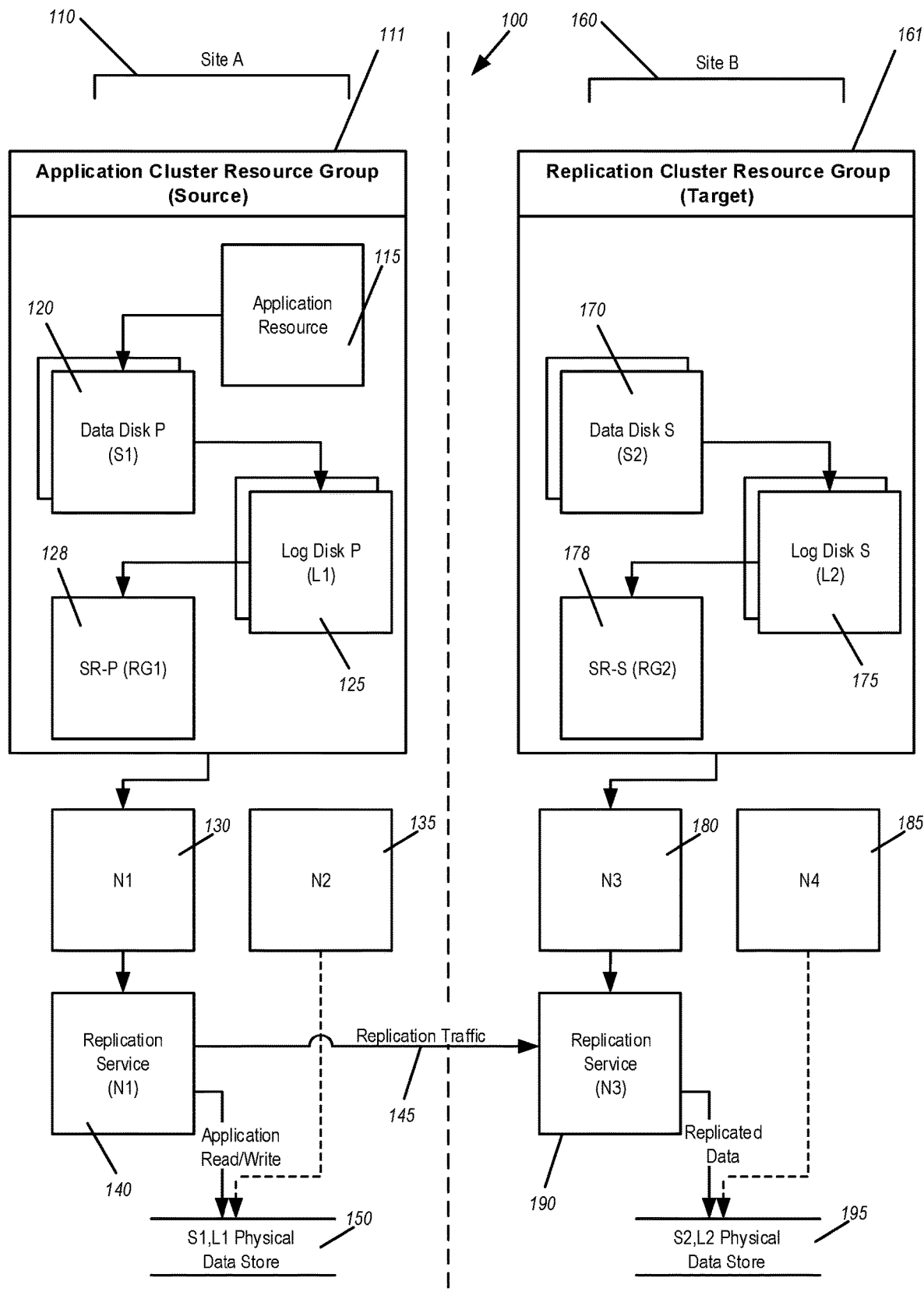
FIG. 1 is a block diagram illustrating a system 100 for providing application transparent continuous availability using synchronous replication across data stores in a failover cluster according to an illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together, or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a block diagram illustrating a system 100 for providing application transparent continuous availability using synchronous replication across data stores in a failover cluster according to an illustrative embodiment. System 100 includes a first site "A" 110 and a second site "B" 160. While only two sites are illustrated in FIG. 1 any number of sites may be present in system 100.

The first site "A" (also referred to as the initial primary site) 110 includes an application cluster resource group 111. The application cluster resource group 111 includes an application resource 115, a data disk 120, a log disk 125, and a storage replication unit 128 (also referred to herein as "primary storage replication unit 128). These components are associated with the underlying application that uses the cluster group. The data generated by this application are stored in these components. The first site may be a data center that hosts the application associated with the application resource 115 or may be a server (physical or virtual) that is hosting the associated application within a data center or other location.

Initial primary site 110 further includes a plurality of nodes 130 and 135. Two nodes are illustrated in FIG. 1 for the purposes of simplicity only. It should be noted that any number of nodes may be present on initial primary site 110. Each of the nodes is associated with an application cluster resource group 111 and more specifically an application resource 115. Each node 130 and 135 of initial primary site 110 can host a different application resource. However, in some embodiments the same application cluster resource group 111 can be hosted on both nodes 130 and 135. In other embodiments node 135 acts a failover node for the application cluster resource group 111 on initial primary site 110. When a failure occurs to an application, the application may failover to node 135. This can occur in situations where the failure is node related as opposed to site related. Initial primary site 110 further includes a replication service 140 and a physical data store 150.

The second or secondary site "B" (also referred to as the initial replication site or the initial secondary site) 160 includes a replication cluster resource group 161. The replication cluster resource group also includes a second data disk 170, a second log disk 175 and a second storage replication unit 178. Initial secondary site 160 also includes a plurality of nodes 180 and 185. As discussed above with respect to initial primary site 110 only two nodes are illustrated in FIG. 1 for purposes of simplicity only. Again, any number of nodes may be associated with initial secondary site 160. Further, initial secondary site 160 includes a second replication service 190 and a second physical data store 195. The components of the second site "B" 160 are functionally similar to those of the first site "A" (the initial primary site) 110, and will not necessarily be described separately.

The present disclosure allows for when the initial primary site 110 that is hosting an application goes down due to a disaster or otherwise fails, and the application resource group (that also contains replicated disks for the application) moves to the initial secondary site 160 that holds a synchronous target replica, that the cluster physical disk resource to physical data store mapping is modified to use the target replica, i.e. the replica on the initial secondary site 160 in data store 195, before the application resource comes online on the initial secondary site 160 resulting in an automatic role switch. This process is managed by the replication services 140 and 190. This process virtualizes the application dependent cluster physical disk resource from multiple synchronous copies of data in various sites allowing seamless failover and failback capabilities. Embodiments allow a cluster replication resource to maintain cluster wide replication state of all target replicas that allows it to decide if a target is eligible to be source of replication in the event of a disaster.

A target replica connects to source replica without using a well-known endpoint. When source replica fails over to a different node within a primary site, the target replica in the secondary site discovers the new endpoint to connect to and resumes replication. The cluster replication resource automatically adjusts the possible owner nodes of the source and target replica based on the replication state, replication service availability, storage connectivity, arrival, or departure of nodes in cluster due to membership changes. This allows the application resource group to failover to only those nodes where this is a high chance of the success due to availability of all required resources.

For the purposes of this discussion, the following terms will be used to describe the functions of the components illustrated in FIG. 1.

Each of the nodes associated with initial primary site 110 can form a replication group such as application cluster resource group 111 and replication cluster resource group 161. It should be noted that any number of nodes may form a replication group. A replication group is in one embodiment a collection of replica instances on a system that are collectively depended on by an application using the data partitions of physical data store 150. The replication service 140 tracks the inter-device write ordering dependencies when replicating multiple devices. A replication group is the unit of replication.

Cluster resource groups: a collection of cluster resources that are grouped together in a cluster and are a unit of failover in a failover cluster. These are illustrated by example application/replication cluster resource groups 111 and 161

Cluster Physical Disk Resource (PDR): A cluster resource that manages physical disk so that it can be accessible by applications, such as applications associated with application resource 115. Application typically depend on cluster physical disks resources so that the data is brought online before it can be accessed by applications Storage Replica Resource: A cluster resource that manages the replication of all replicas in a replication group. Storage replication unit resources are represented by elements 128 and 178 in FIG. 1 (primary and secondary, respectively). It should be noted that in FIG. 1, a "p" represents the features on the current primary site and an "s" represented features on a currently secondary site.

Asymmetric Storage Cluster: An asymmetric storage cluster is a failover cluster deployment where a data store such as physical disks are not connected to every node of the cluster. Such deployments are typical found when the cluster spans multiple geographical sites where physical storage can be accessed by only the nodes in a given site.

In order to effectively implement the structure illustrated in FIG. 1, the replication groups must first be created. The replicas that belong to a group are grouped together into a cluster replication group (e.g. application/replication cluster resource groups 111 and 161). The cluster physical disk resources are part of replication group that represent the replicas. The replication groups depend from a cluster physical disk resource, that in turn depends on the storage replication cluster resource.

In one illustrative embodiment, the application resource 115 that consume data from physical disks, depend on the physical disk cluster resource. This dependency chain ensures that the start of the resources are done in an order that ensures that dependent resources are available before application can start consuming the data on the disks.

The physical data store 150, in one embodiment, is a physical disc cluster resource that implements shared storage for the various nodes (e.g. nodes 130 and 135) of the application cluster resource group 111. Physical disk cluster resources typically have a private property that indicates the physical data store 150 it manages. A physical data store 150 in a cluster is connected to multiple nodes (e.g. nodes 130 and 135) that allows the data to be available on multiple nodes when the application and physical disk cluster resource fail over to other nodes. The physical disk cluster resource takes persistent reservation on physical data store 150 so that is accessible on only one of the nodes of cluster to avoid simultaneous edits to data from multiple nodes. The physical disk cluster resource also mounts the volume/file systems when it comes online on a node. Collectively these are illustrated by block 150.

The replication service 140 is in one embodiment a replication cluster resource that is configured to determine if primary storage (physical disks part of physical data store 150 that are part of source replica) is connected to the node where the resource group is coming online (e.g. application cluster resource group 111 coming online on initial primary site 110). If the storage is not connected, the replication service 140 starts an automatic role switch process. Role switching is a process where the source and target of replication are switched, thereby reversing the direction of data replication. Role switching is typically performed, for example, as part of disaster recovery when the current primary site (e.g. initial primary site 110) goes down or when the current primary needs to be taken down for maintenance. Automatic role switching reverses the direction of replication automatically when the replication service detects that the current primary physical storage or nodes are no longer available thereby providing continuous availability of data to application, without the need for an administrator to interact directly with the system during the failover.

In one embodiment, the replication service 140 determines if the physical data store 150 is not currently connected by implementing an associated process. If the physical data store 150 is determined not to be connected, the replication service 140 begins a process to role switch to one of the secondary replication groups. The process begins by determining if there are other replication groups (e.g. replication cluster resource group 161) that can take over as new primary based on their replication status. If the replication group is in a sync state with an old primary, then it is also a candidate to be selected as new primary. Next, the process determines if the replication group is connected to the cluster node where the resource group is coming online.

Once a candidate replication group is selected, a role switch will be performed. This role switch results in the current primary replication group, e.g. application cluster resource group 111, will be changed to become the target of replication (secondary). The selected secondary replication group, e.g. replication cluster resource group 161, will be changed to become the source of replication (primary).

To implement the role switch, the process begins by swapping the binding of the physical disk cluster resource to the physical data storage of the primary and secondary physical cluster disk resources. Next, the process swaps the replication group private property associated with the replication cluster resource. Next, the secondary cluster resource group is moved to the newly designated primary site identified in the paragraph above.

The process continues by updating the possible owners of the primary and secondary resource groups to include only those cluster nodes that are within those sites. Possible owners of a cluster resource are a set of nodes where the cluster can try to bring the resource online. A replication group may be hosted only on nodes where the replication service is available, and the physical data store is available. Again, nodes may be located on different sites. Additionally, when a primary replication group has synchronous partners the primary cluster resource group can also be failed over to those nodes where current synchronous secondary data store is available. Again, in FIG. 1 a "p" indicates a primary and an "s" indicates a secondary.

Continuing with the process of role switching the replication service tries to online the secondary replication groups (e.g. application/replication cluster resource groups 111 and 161). This process includes ensuring that the flow of replication traffic data 145 from the primary site is able to reach the replication service 190 of the initial secondary site 160. Once the primary replication resource comes online, the system brings online the log disk and data disk associated with the primary resource group, e.g. elements 125 and 120, respectively.

The replication service 140 maintains a cluster wide view of replication status of all replication groups within a cluster. The replications status indicates which replication group(s) are in "sync" status and which are not in "sync" status. If a synchronous secondary replication group loses replication connection to its primary or if there is a failure replicating certain data to a secondary, the replication status of the secondary replication group is changed to NOT IN SYNC before the primary deviates or allows any new input/output to proceed at the primary replication group to the secondary replication group.

A replication group can failover within a cluster. When that happens, the replication to secondary should resume after failover completes. In the absence of a well-known replication service endpoint (e.g. a cluster network name resource is an example of a well-known endpoint), a failover means a change in replication service endpoint as the node hosting the replication service changes for the source or target of replication. The older node that a secondary node was connected to is no longer valid. The secondary should rediscover the source replication service endpoint and resume replication. In one illustrative implementation when the primary cluster resource group fails over to a different node, during the online sequence it restarts the secondary replication group. The secondary then during its online sequence queries the cluster service to determine the owner node of the primary resource group and uses that node name as primary replication service endpoint. The primary also sends a cluster resource notification to secondary replication groups to indicate the new replication endpoint.

Figure 2:
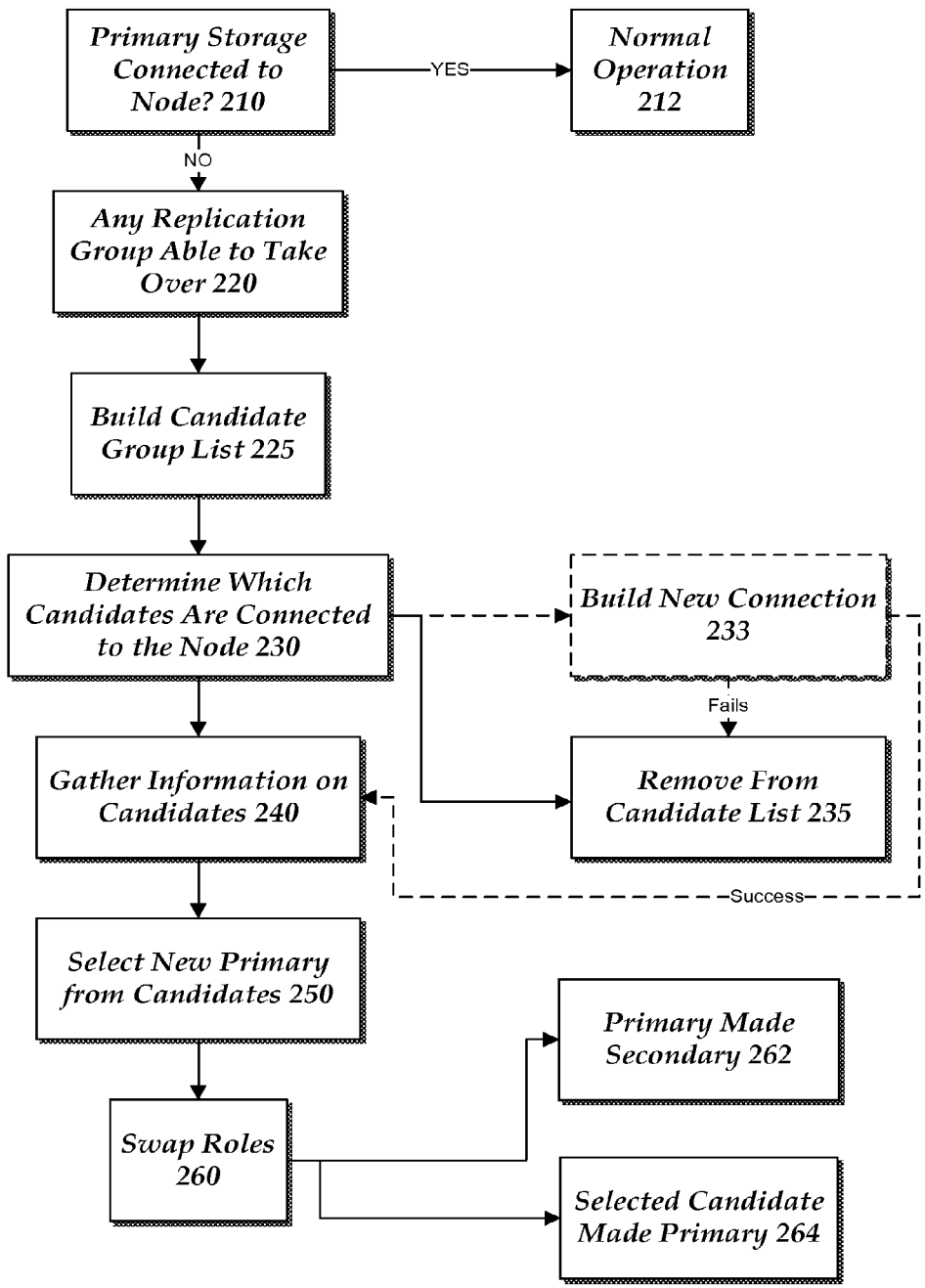
FIG. 2 is a flow diagram illustrating a process for selecting a secondary replication group and automatically performing role switching according to one illustrative embodiment.

FIG. 2 is a flow diagram illustrating a process for selecting a secondary replication group and automatically implementing a role switch according to one illustrative embodiment. As the replication cluster resource is at the bottom of a resource dependency chain, the process begins by determining if the primary storage 120 is connected to the node. This is illustrated at step 210. This determination can be made by sending a command to the primary storage 120 and awaiting a return from the primary storage 120. Alternatively, the process can be looking for a heartbeat to come from the primary storage 120. Other methods of determining if the primary storage 120 is connected to the node can be used as well. During normal operations, this check occurs when the associated resource group is first coming online. However, this check can also occur while the resource group is operating. When the check occurs while the resource group is operating this check can occur at periodic intervals or can be a continuous check.

If the primary storage 120 is determined to be online and connected to the resource group, the operation of the system continues as normal. This normal operation is illustrated at step 212.

However, if it is determined that the storage is not connected the process moves to step 220 to begin the process of role switching the storage. At step 220, the process determines if there are any replication groups 178 that can take over as primary storage replication unit 128. Each candidate is added to a candidate list. This is illustrated at step 225. Steps 220 and 225 are discussed herein together. In order to be a candidate to take over as the primary storage replication unit 128, the process looks to or analyzes the replication status of each of the candidate replication groups. The replication service 140, 190 maintains a cluster wide view of the replication status of all replication groups within a cluster. The replications status indicates which replication groups are in "sync" status and which are not in "sync" status. If a synchronous primary replication group 178 loses replication connection to its primary or if there is a failure replicating certain data to a secondary, the replication status of the secondary replication groups is changed to "NOT IN SYNC" status before the primary deviates or allows any new input or outputs to proceed at the primary replication group. If the replication status of the candidate replication cluster resource group 161 is determined to be in sync with the old primary site that candidate replication group is consider do be a valid candidate replication group for selection as a new primary replication group. If it is not in "sync" with the old primary storage replication unit 128, that candidate is removed from the list of potential candidates.

Once a list of potential candidate replication groups has been determined, the process continues to determine which of the candidate replication groups is connected to the cluster node where the resource group is coming online. This is illustrated at step 230. If the replication group is connected to the cluster node then that replication group remains in the candidate list. At this time, the system may gather information about that replication group and the associated connection between the replication group and the node or resource group. This information can include features such as the size or capacity of the replication group, the location of the replication group, connection speed, quality of the connection, etc. This information is gathered at step 240.

If the replication group is not connected to the node the process moves to step 235. At step 235, the system can remove the replication group from the candidate list of resource groups. However, in some embodiments the system can try to have a connection generated for the resource group to connect to the node. This is illustrated by optional step 233. Step 233 would typically occur before step 235. If a connection can be created, the system causes a command to be generated that will cause the resource group to connect to the node. If the connection is successful, the analysis moves to step 240. Otherwise, the replication group is removed from the list of candidate replication groups.

Once a final list of replication groups is generated, the process proceeds to select one of the candidate replication groups as the new primary replication group. This is illustrated at step 250. The process may select the new primary storage replication unit based upon the gathered characteristics for each of the candidates in the list of candidate replication groups. In some approaches, the selection is based on an existing set of rules for the resource group. For example, the location of the replication group may be constrained based on location. This can occur for certain applications where the data cannot leave a particular country. In this example, the candidate replication groups not meeting this location requirement are now removed or not considered further. The system can look at performance or other quality characteristics in choosing which candidate replication group to select. The system may select the best performing replication group from the candidates. However, the system may simply select a random candidate from the list of candidates.

Once the candidate is selected from the list, the process at step 250 continues by swapping or changing the roles of the two replication groups. This is illustrated by step 260. At this step, the current primary storage replication unit 128 is changed to become a target of the replication. That is, the old primary storage replication unit 128 is now a secondary replication group. This is illustrated at step 262. Also, the selected replication group will be changed to become the new primary replication group. This is illustrated at step 264. The processes of steps 262 and 264 are essentially the same except for the changes made to the corresponding replication group.

Figure 3:
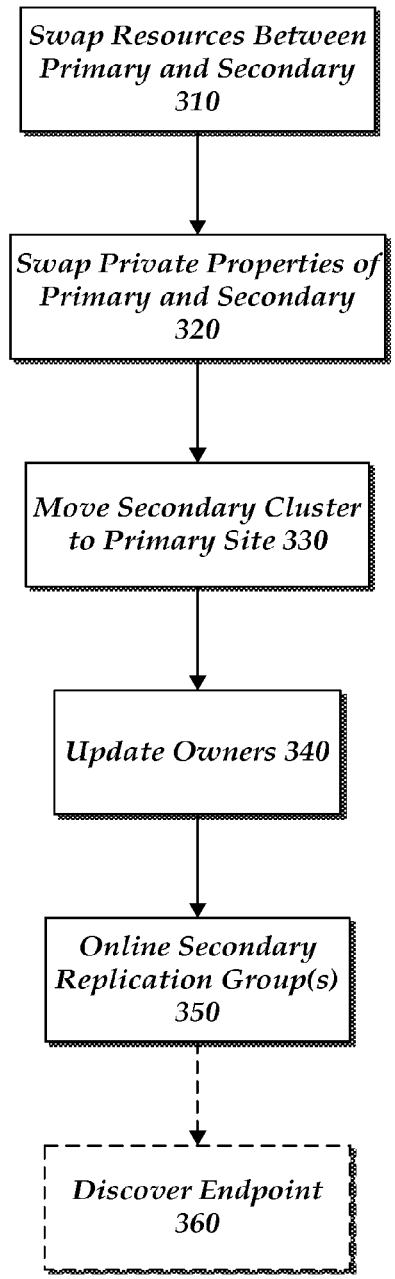
FIG. 3 is a flow diagram illustrating a process for switching roles according to one embodiment.

The process that occurs on each of the replication groups to initiate the role switch is described with respect to FIG. 3. The process of FIG. 3 corresponds closely to step 260 and included steps 262 and 264 of FIG. 2. The first step of the process is to swap the physical disk cluster resource to physical data storage binding of the primary physical disk cluster resources and the secondary physical cluster disk resources. This is illustrated at step 310. At this step, the characteristics of the primary physical disk cluster resources are changed to mimic the secondary physical disk characteristics and the secondary physical disk's characteristics are changed to reflect those characteristics of the primary physical disk cluster resource.

Next, the replication group private property of each of the replication cluster resources is swapped. This is illustrated at step 320. As discussed above every physical disk cluster resource has a private property that indicates the physical data store it manages. The physical data store in a cluster is connected to multiple nodes (e.g. nodes 130, 135 and nodes 180, 185) and allows the data to be available on multiple nodes so that the application and the physical disk cluster resource can fail over to other nodes. The physical disk cluster resource takes persistent reservation on physical storage so that is accessible on only one of the nodes of cluster to avoid simultaneously edits to data from multiple nodes. Thus, the private property of the cluster resource is changed to accept the edits from this node of the cluster.

Following the swapping of the private properties and the binding of the resources the secondary cluster resource group is moved to the primary site. This is illustrated at step 330. Next, the possible owners of the primary and secondary resource groups are updated. This is illustrated at step 340. The possible owners are updated to include only those cluster nodes that are within those sites. Possible owners of a cluster resource are a set of nodes where the cluster can try to bring the resource online. A replication group can be hosted only on nodes where the replication service 140, 190 is available and the physical data store is available. Additionally, when a primary storage replication unit 128 has synchronous partners, the primary cluster resource group (e.g. application cluster resource group 111) can also be failed over to those nodes where current synchronous secondary data store is available.

Next, the secondary replication group(s) attempt to come online. This is illustrated at step 350. At this point, the secondary may have to discover the replication endpoint. If the secondary resource group knows the replication endpoint, such as a cluster network name resource, the resource group is able to come online quickly or with minimal delay. However, during a failover a change in the replication service endpoint can occur as the node that was hosting the replication service 140, 190 changes for the source and/or target of the replication. This occurs as the older node to which one of the secondary resource groups may no longer be valid. In some cases, the new endpoint is known. However, if the replication endpoint is unknown then the secondary resource group needs to discover the replication end point. This is illustrated at optional step 360. In this case, the primary replication group 178 rediscovers the source replication endpoint and resumes the replication process. The primary replication group 178 then as part of the online sequence queries the cluster service to determine the owner node of the primary resource group and uses that node's name as primary replication service endpoint. At this time, the primary storage replication unit 128 can also send a cluster resource notification to the secondary replication groups to indicate the new replication endpoint. Once the endpoint has been discovered and the secondary storage replication unit 178 has come online, the failover process is completed. Operation then returns to normal for the application.

Figure 4:
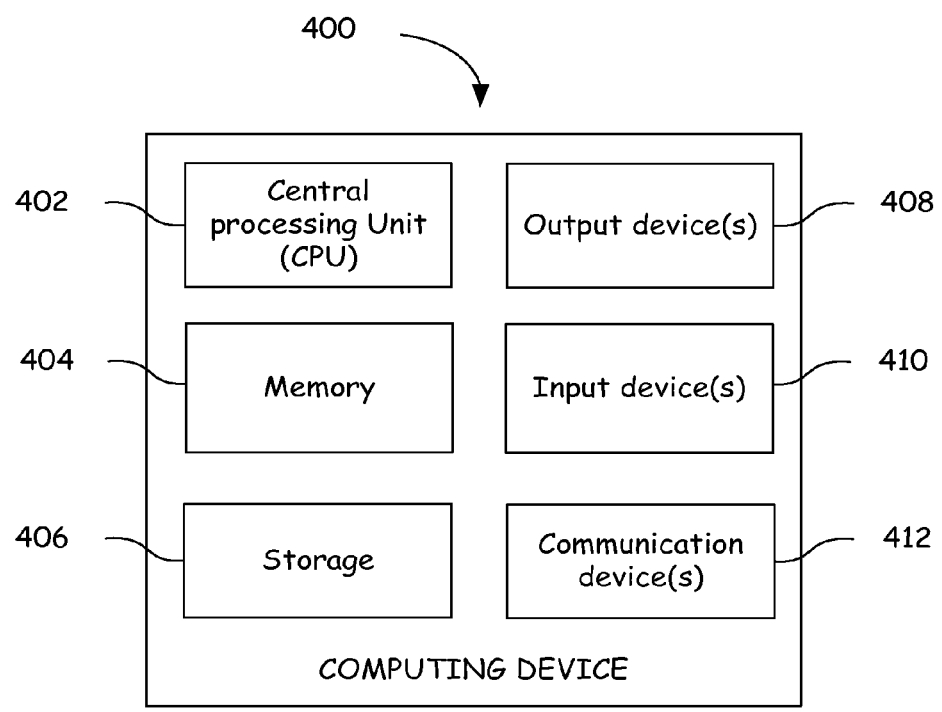
FIG. 4 is a block diagram illustrating a computing device that can implement the enhanced indexing system according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive, and transmit digital signals. In another example, the computing device 400 can be utilized to process calculations, execute instructions, receive and transmit digital signals, receive and transmit search queries, and hypertext, compile computer code, as required by the system of the present embodiments. Further, computing device 400 can be a distributed computing device where components of computing device 400 are located on different computing devices that are connected to each other through network or other forms of connections. Additionally, computing device 400 can be a cloud based computing device.

The computing device 400 can be any general or special purpose computer now known or to become known capable of performing the steps and/or performing the functions described herein, in software, hardware, firmware, or a combination thereof.

In its most basic configuration, computing device 400 typically includes at least one central processing unit (CPU) or processor 402 and memory 404. Depending on the exact configuration and type of computing device, memory 404 may be volatile (such as RAM), non-volatile (such as ROM, flash memory, etc.), or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 4 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method for failing over an application from a failed primary site to a replication site, the method comprising:
    determining that the primary site has failed, based at least on one or more primary nodes of the primary site not being connected to an application cluster resource group (ACRG) at the primary site;
    based at least on the determination that the primary site has failed:
        building a candidate list of a plurality of replication cluster resource groups (RCRG) at secondary sites that are each capable of becoming a new ACRG;
        selecting a particular RCRG at a particular secondary site from the candidate list, based at least on removing another RCRG at another secondary site from the candidate list;
        converting the particular RCRG to be the new ACRG; and
        designating the particular secondary site as a new primary site; and
    prior to bringing the application online, configuring the application to execute on one or more new primary nodes and the new ACRG at the new primary site, including configuring a mapping of a cluster physical disk resource to a physical data store.

2. The method of claim 1, wherein removing the other RCRG at the other secondary site from the candidate list is based at least on a failure to establish a connection to the other RCRG.

3. The method of claim 1, wherein removing the other RCRG at the other secondary site from the candidate list is based at least on an analysis of a replication status of each RCRG.

4. The method of claim 3, wherein the replication status of each RCRG indicates whether each RCRG is in sync status, or is not in sync status.

5. The method of claim 1, wherein the particular RCRG at the particular secondary site is selected from the candidate list based upon gathered characteristics for each candidate in the candidate list.

6. The method of claim 5, wherein the gathered characteristics comprise one or more of geographical location, performance characteristics, or quality characteristics.

7. The method of claim 1, wherein the particular RCRG at the particular secondary site is selected from the candidate list based upon a geographical constraint.

8. A computer system, comprising:
    one or more processors; and
    one or more computer-readable media having stored thereon computer-executable instructions that are executable by the one or more processors to cause the computer system to fail over an application from a failed primary site to a replication site, the computer-executable instructions being executable to cause the computer system to at least:
        determine that the primary site has failed, based at least on one or more primary nodes of the primary site not being connected to an application cluster resource group (ACRG) at the primary site;
        based at least on the determination that the primary site has failed:
            build a candidate list of a plurality of replication cluster resource groups (RCRG) at secondary sites that are each capable of becoming a new ACRG;
            select a particular RCRG at a particular secondary site from the candidate list, based at least on removing another RCRG at another secondary site from the candidate list for failure to establish a connection to the other RCRG;
            convert the particular RCRG to be the new ACRG; and
            designate the particular secondary site as a new primary site; and
        prior to bringing the application online, configure the application to execute on one or more new primary nodes and the new ACRG at the new primary site, including configuring a mapping of a cluster physical disk resource to a physical data store.

9. The computer system of claim 8, wherein removing the other RCRG at the other secondary site from the candidate list is based at least on an analysis of a replication status of each RCRG.

10. The computer system of claim 9, wherein the replication status of each RCRG indicates whether each RCRG is in sync, or is not in sync.

11. The computer system of claim 8, wherein the particular RCRG at the particular secondary site is selected from the candidate list based upon gathered characteristics for each candidate in the candidate list.

12. The computer system of claim 11, wherein the gathered characteristics comprise one or more of geographical location, performance characteristics, or quality characteristics.

13. The computer system of claim 8, wherein the particular RCRG at the particular secondary site is selected from the candidate list based upon a geographical constraint.

14. The computer system of claim 8, wherein the particular RCRG at the particular secondary site is selected from the candidate list based upon a random selection.

15. A computer program product comprising one or more hardware storage devices having stored thereon computer-executable instructions that are executable by one or more processors to cause a computer system to fail over an application from a failed primary site to a replication site, the computer-executable instructions being executable to cause the computer system to at least:
   determine that the primary site has failed, based at least on one or more primary nodes of the primary site not being connected to an application cluster resource group (ACRG) at the primary site;
   based at least on the determination that the primary site has failed:
      build a candidate list of a plurality of replication cluster resource groups (RCRG) at secondary sites that are each capable of becoming a new ACRG;
      select a particular RCRG at a particular secondary site from the candidate list, based at least on removing another RCRG at another secondary site from the candidate list for having a not in sync status;
      convert the particular RCRG to be the new ACRG; and
      designate the particular secondary site as a new primary site; and
   prior to bringing the application online, configure the application to execute on one or more new primary nodes and the new ACRG at the new primary site, including configuring a mapping of a cluster physical disk resource to a physical data store.

16. The computer program product of claim 15, wherein removing the other RCRG at the other secondary site from the candidate list is based at least on a failure to establish a connection to the other RCRG.

17. The computer program product of claim 15, wherein a replication status of each RCRG indicates whether each RCRG is in sync, or is not in sync.

18. The computer program product of claim 15, wherein the particular RCRG at the particular secondary site is selected from the candidate list based upon gathered characteristics for each candidate in the candidate list.

19. The computer program product of claim 18, wherein the gathered characteristics comprise one or more of geographical location, a performance characteristic, or a quality characteristic.

20. The computer program product of claim 15, wherein the particular RCRG at the particular secondary site is selected from the candidate list based upon a geographical constraint.

* * * * *